US012723659B2

(12) United States Patent
Hennecke

(10) Patent No.: US 12,723,659 B2
(45) Date of Patent: Sep. 1, 2026

(54) VALVE ASSEMBLY, PRESSURE VESSEL SYSTEM, VEHICLE, AND METHOD FOR DISCHARGING FUEL

(71) Applicant: Bayerische Motoren Werke Aktiengesellschaft, Munich (DE)

(72) Inventor: Joerg Hennecke, Haar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 63 days.

(21) Appl. No.: 18/711,390

(22) PCT Filed: Nov. 18, 2022

(86) PCT No.: PCT/EP2022/082436

§ 371 (c)(1),
(2) Date: May 17, 2024

(87) PCT Pub. No.: WO2023/089109

PCT Pub. Date: May 25, 2023

(65) Prior Publication Data

US 2025/0020218 A1 Jan. 16, 2025

(30) Foreign Application Priority Data

Nov. 19, 2021 (DE) ..................... 10 2021 130 250.1

(51) Int. Cl.
*F16K 1/30* (2006.01)
*F16K 35/14* (2006.01)

(52) U.S. Cl.
CPC .............. *F16K 1/305* (2013.01); *F16K 35/14* (2013.01)

(58) Field of Classification Search
CPC ... F16K 1/305; F16K 35/14; Y10T 137/87113
See application file for complete search history.

(56) References Cited

U.S. PATENT DOCUMENTS 1,167,257 A * 1/1916 Best .......................... F23Q 9/00 137/637.1
1,898,569 A * 2/1933 Pearson .................. F16K 5/106 74/528

(Continued)

FOREIGN PATENT DOCUMENTS

DE 150 200 A 3/1904
DE 199 34 457 A1 2/2001

(Continued)

OTHER PUBLICATIONS

International Search Report (PCT/ISA/210) issued in PCT Application No. PCT/EP2022/082436 dated Feb. 20, 2023 with English translation (8 pages).

(Continued)

*Primary Examiner* — Craig M Schneider
*Assistant Examiner* — Nicole Gardner
(74) *Attorney, Agent, or Firm* — Crowell & Moring LLP

(57) ABSTRACT

A valve assembly for a fuel pressure vessel system includes: a fuel line; a shutoff valve at the fuel line, which shutoff valve is to be manually actuated; a discharge opening fluidically connected to the fuel line; and a closure element. The shutoff valve is designed to prevent a movement of the closure element from a first position, in which the closure element closes the discharge opening, into a second position, in which the closure element allows flow through the discharge opening, when the shutoff valve is in its open position. The shutoff valve is designed to allow the movement of the closure element from the first position into the second position when the shutoff valve is its closed position, in which the shutoff valve closes the fuel line.

13 Claims, 6 Drawing Sheets

(56) References Cited

U.S. PATENT DOCUMENTS

| | | | | |
|---|---|---|---|---|
| 2,591,602 | A * | 4/1952 | Pilcher | G05G 5/08 137/637.4 |
| 3,840,038 | A * | 10/1974 | Smith | F16K 7/06 137/637.1 |
| 4,429,711 | A | 2/1984 | Schomer | |
| 4,458,706 | A * | 7/1984 | Scholes | B67C 3/001 137/637.1 |
| 6,634,178 | B1 | 10/2003 | Michel et al. | |
| 2007/0056643 | A1* | 3/2007 | Larsen | F16K 1/305 137/625.42 |
| 2011/0048576 | A1* | 3/2011 | Meisner | F17C 13/00 141/82 |
| 2014/0261778 | A1 | 9/2014 | Hamilton | |
| 2016/0091143 | A1* | 3/2016 | Cohen | F17C 13/002 137/12 |
| 2017/0016579 | A1 | 1/2017 | Pelger et al. | |
| 2020/0149683 | A1 | 5/2020 | Kreutzer et al. | |
| 2020/0240524 | A1 | 7/2020 | Vignerol et al. | |

FOREIGN PATENT DOCUMENTS

| | | | |
|---|---|---|---|
| DE | 10 2014 205 712 | A1 | 10/2015 |
| DE | 10 2017 007 628 | A1 | 2/2019 |
| EP | 3 428 500 | B1 | 4/2020 |
| EP | 3 692 285 | B1 | 9/2021 |
| GB | 2 236 829 | A | 4/1991 |

OTHER PUBLICATIONS

German-language Written Opinion (PCT/ISA/237) issued in PCT Application No. PCT/EP2022/082436 dated Feb. 20, 2023 with English translation (9 pages).

German-language Search Report issued in German Application No. 10 2021 130 250.1 dated Aug. 29, 2022 with partial English translation (11 pages).

* cited by examiner

VALVE ASSEMBLY, PRESSURE VESSEL SYSTEM, VEHICLE, AND METHOD FOR DISCHARGING FUEL

BACKGROUND AND SUMMARY

The technology disclosed herein relates to a valve assembly, a pressure vessel system having the valve assembly, a vehicle having the pressure vessel system and a method for draining fuel.

Pressure vessel systems for storing fuel in a vehicle (in particular a ground vehicle, a water-borne vehicle or an aircraft) are known as such. It is also known that such pressure vessel systems can have diverse valves and one or more drainage connections (so-called bleed ports) having drainage openings for draining the fuel from the pressure vessel system. At least one of these valves ("manual valve") can be actuated manually in order when required, for example during maintenance of the vehicle, to separate a part of the fuel supply system of the vehicle from the pressure vessel, the part being downstream of the valve. A further one of these valves is a so-called drain valve ("bleed valve"), which can be provided for determining a fuel flow through the drainage opening.

Document GB 2 236 829 A discloses a valve having a central, straight main flow channel which is controlled by primary and secondary shut-off valves which flank a central venting valve which connects the main flow channel to a venting channel. The valve element of each of the valves is a ball having (in the case of the primary/secondary shut-off valves) a straight passage and (in the case of the ball of the venting valve) a three-way passage, wherein each of the balls is rotatable about an axis by means of a respective lever. Each of the levers is connected in a rotationally conjoint manner to a partially circular cam, wherein the cams are arranged in a common plane so as to interact with one another in such a way that opening of the primary shut-off valve is prevented while the venting valve is open.

It is a preferred object of the technology disclosed herein to reduce or to eliminate at least one disadvantage of a previously known solution or to propose an alternative solution. It is in particular a preferred object of the technology disclosed herein to provide an installation space-efficient valve assembly which can be produced in a comparatively simple and cost-effective manner. Furthermore, it is a preferred object of the technology disclosed herein to provide a corresponding pressure vessel system, a corresponding vehicle and a corresponding method for draining fuel. Further preferred objects can arise from the advantageous effects of the technology disclosed herein.

This object/these objects is/are achieved by the subject of the independent claim(s). The dependent claims represent preferred embodiments.

In accordance with one aspect of a valve assembly proposed herein, which is provided for a fuel pressure vessel system, the valve assembly comprises a fuel line, a manually actuated shut-off valve on the fuel line, a drainage opening that is connected to the fuel line in a fluid-conducting manner, and a closure element for the drainage opening. The shut-off valve is configured so as to prevent a movement of the closure element from a first position, in which the closure element closes the drainage opening in particular in a gas-tight manner, into a second position, in which the closure element enables a through-flow through the drainage opening, when the shut-off valve is in its open position. Furthermore, the shut-off valve is configured so as to allow the movement of the closure element from the first position into the second position when the shut-off valve is in its closed position closing off the fuel line.

In this manner, it is possible in a simple and effective manner to ensure that a first part of the fuel line (namely the part of the fuel line that is connected to the drainage opening in a fluid-conducting manner and is separated by the shut-off valve) can be emptied after closing the shut-off valve and moving the closure element into its second position, whereas a second part of the fuel line on the side of the shut-off valve that is opposite the first part remains pressurized. Consequently, the function of a drain valve (bleed valve) is integrated in the manually actuated shut-off valve. The valve assembly in accordance with the present technology therefore not only renders it possible to effectively reduce fuel loss during maintenance procedures but rather also to reduce the duration of the draining of the fuel.

Fuel from the second part of the fuel line can also be efficiently drained by means of this valve assembly, namely by moving the shut-off valve into its open position ("open"). Since the shut-off valve itself is used to secure the closure element, it is not necessary to provide an additional shut-off valve so as to control the draining of the fuel from the second part. Furthermore, the valve assembly renders it possible in a synergetic manner to reduce the risk of incorrect operation by opening the closure element when the shut-off valve is open, thus also reducing the risk of injury.

The fuel line can have an inlet for connecting to a storage device for the fuel and an outlet for connecting to a consumer of the fuel. It is preferred that the fuel line is designed as a pressure line in order to be able to withstand a fuel pressure greater than 100 bar, in particular at least up to 700 bar. In this respect, the fuel line is a fuel pressure line. In particular, the fuel can be hydrogen gas. Accordingly, the fuel line can be suitable for conducting hydrogen gas at the specified fuel pressure. Similarly, the shut-off valve can be suitable for blocking a hydrogen gas flow by means of the shut-off valve when the shut-off valve is in its closed position.

Consequently, within the scope of the present disclosure, the term 'closed position' refers to the particular position of the shut-off valve in which a fuel flow, in particular a hydrogen flow, is essentially completely interrupted by means of the shut-off valve. 'Essentially completely' means here that at most a slight leakage flow can pass through the shut-off valve due to manufacturing tolerances at the seal seat of the shut-off valve. This applies similarly for the closure of the drainage opening when the closure element is in the first position. The open position of the shut-off valve differs from the closed position by virtue of the fact that fuel can flow through the shut-off valve in the intended manner. The shut-off valve does not need to be completely open for this; on the contrary, it is sufficient that the shut-off valve is partially open, in particular is not located in its closed position that is explained above.

Preferably, the shut-off valve prevents the closure element from moving from the first position into the second position by a section of the shut-off valve blocking the path of a section of the closure element, in particular the engagement section that is explained in more detail below, so that the latter cannot move into the second position. In other words, the shut-off valve can preferably prevent the specified movement of the closure element by direct mechanical interaction (contact) with the closure element. For this purpose, it is preferably provided that the drainage opening and the closure element are arranged adjacent to each other and in series (one behind the other) along the fuel line. The drainage opening is preferably arranged at a distance from the shut-off valve and, in particular, from the seal seat of the shut-off valve. In particular, the drainage opening can be connected to the fuel line at a site in the fuel line between the shut-off valve and the outlet of the fuel line. Such an arrangement can be realized in a comparatively simple and gas-tight manner if the valve assembly is designed as a one-piece valve block. This valve block can have a valve block body made of a solid material, through which the fuel line (preferably designed as a through-going hole) runs. Alternatively, it is conceivable that the fuel line is designed as a tube or hose.

In a preferred variant, the mechanical interaction between the shut-off valve and the closure element is realized by means of a positive-locking connection between the shut-off valve and the closure element. In particular, the closure element can be locked in the first position by means of the shut-off valve when the shut-off valve is in its open position. The shut-off valve can conversely unlock the closure element when it moves into the closed position. Whereas the positive-locking connection can be fundamentally realized in numerous ways, it can be designed in a particularly simple and installation space-efficient manner when a connecting means that is fixedly connected to the shut-off valve or the closure element extends between the closure element and the shut-off valve, by means of which the movement of the closure element from the first position into the second position is blocked.

In a particularly preferred variant, in addition to a closing section which closes the drainage opening in the first position, the closure element comprises the connecting means that is designed here as the engagement section. It is preferred that the engagement section extends from the closing section to the shut-off valve, in particular to the locking bolt of the shut-off valve, the locking bolt is explained below. In this case, the shut-off valve, in particular the locking bolt, can engage in the engagement section, in particular in a recess that is formed in the closure element, when the shut-off valve is in the open position or when the closure element is arranged in the first position, so that the shut-off valve/the locking bolt blocks the movement of the closure element. Only when the shut-off valve or the locking bolt no longer engages in the closure element/the engagement section can the closure element complete the movement from the first position into the second position in order to open the drainage opening (i.e. to allow/release the through-flow through the drainage opening). Furthermore, in this case a movement in the opposite direction, i.e. from the second position into the first position is also preferably not prevented by the shut-off valve/the locking bolt.

The locking bolt of the shut-off valve can be rigidly connected to a valve element of the shut-off valve. In the closed position of the shut-off valve, this valve element can lie in a sealing manner against the seal seat of the shut-off valve in order to prevent a through-flow through the shut-off valve. The rigid connection can be implemented in such a manner that a movement of the valve element in accordance with a movement vector results in a movement of the locking bolt in accordance with the same movement vector. In particular, it is possible to provide that the locking bolt is itself simply the valve element. The statements in this disclosure with regard to the valve element can apply accordingly for the locking bolt and conversely.

The valve element can be accommodated in a valve body of the shut-off valve and can be moved axially in the direction of the seal seat and away from the seal seat in order to move the shut-off valve into its closed position or open position. In particular, the valve body can be designed as one piece with the valve block body. In a preferred variant, the valve element/the locking bolt can be connected in a positive-locking manner to the valve body, in particular fixedly screwed in the valve body. In particular, the valve body can have a limiting device (stop) which is designed so as to limit the movement of the valve element in the direction away from the seal seat of the shut-off valve when the shut-off valve is in the open position. Consequently, the valve element can be mounted in a practically permanently captive manner in the valve body.

It is preferred that the valve element is designed in sections or completely as a threaded pin (or bolt) with an outer thread and a conical tip and is arranged in such a manner in a receiving device which is formed in the valve body for the valve element that the conical tip lies in a sealing manner against the seal seat when the shut-off valve is closed. The threaded pin can thus be screwed in an axial manner in the receiving device between the seal seat and the limiting device and is provided for this purpose with an inner thread at least in sections. A particularly compact construction can be realized if the valve element is inserted essentially completely in the receiving device in the closed position, i.e. protrudes beyond the valve body or the valve block body.

In a similar manner to the valve element/the locking bolt, the closing section of the closure element can also be connected in a positive-locking manner to a receiving device for the closing section, in particular screwed in in the region of the drainage opening, in order to provide its function (the receiving device being formed for example in the valve block body). It is possible to maintain the positive-locking connection while the closing section moves starting from the first position in the direction of the second position. In the second position, the positive-locking connection can be established or released. In particular, the closure element can be designed as a separate component. The closure element can be designed for example as a screw closure (in particular as a screwable plug or cover) and/or can be removed from the receiving device in a non-destructive and reversible manner. The positive-locking connection between the closure element and the receiving device for the closure element can be designed as a threaded connection or bayonet closure.

It is preferred that the fuel line is open so as to receive the closing section. In this case, the engagement section can be designed in an installation space-efficient manner as a planar cantilever that in the first position extends in a radial manner with respect to the receiving device and the recess for the locking bolt is arranged on the end of the cantilever that faces the shut-off valve. In other words, when the locking bolt lies against the seal seat in the closed position of the shut-off valve, the planar cantilever can be pivoted adjacent to and along an outer surface of the valve body in order to move the closure element from the first position into the second position. In the second position, the closure element can also be completely unscrewed (loose) from the receiving device.

In a further preferred variant, the valve assembly comprises moreover a separate collecting facility having a collecting vessel for fuel that is drained out of the fuel line via the drainage opening. It is preferred that the collecting facility can be connected to the drainage opening by means of the same positive-locking connection as the closure element, so that the closure element can be practically interchanged with a corresponding connection of the collecting facility. In particular, it is possible to provide that the same threaded connection or the same bayonet closure is provided for this connection as in the case of the connection between the closing section and the receiving device.

A pressure vessel system proposed herein for a vehicle is provided for storing fuel and comprises a valve assembly, described in detail above, and at least one pressure vessel which is connected to the inlet in a fluid-conducting manner. In this case, the drainage opening can be connected to the fuel line at a site on the fuel line between the shut-off valve and the outlet. In this arrangement, the shut-off valve can be the particular valve whose inlet pressure corresponds (essentially) to the vessel pressure of the pressure vessel.

In this manner, it is not only possible to ensure that the second part of the fuel line is sealed off from the first part before the fuel is drained from the first part of the line. Rather, the connection to the at least one pressure vessel can remain established without unintentionally emptying the pressure vessel when the closure element is moved into the second position. It is thus possible in a synergetic manner to reduce the risk of injury when opening the drainage opening and fuel can be saved.

The vehicle proposed herein has a pressure vessel system described above and a drive unit. The drive unit is preferably connected to the outlet of the fuel line in a fluid-conducting manner by means of a fuel supply system. It is preferred that the drive unit comprises an energy converter, in particular a fuel cell, which can be operated by the fuel. When emptying the first part of the fuel line, it is thus possible in a comparatively simple and safe manner to simultaneously empty a part of the fuel supply system which is connected to the outlet in a fluid-conducting manner.

The method proposed herein is used to drain fuel from a valve assembly described above or a pressure vessel system explained above and comprises the steps: closing the fuel line by means of the shut-off valve so that the shut-off valve is in its closed position; and moving the closure element from the first position into the second position. As soon as the closure element is in the second position, the fuel can flow through the drainage opening from a part of the pressure vessel system, in particular from the first part of the fuel line, the part is located relative to the shut-off valve on the side of the outlet.

Furthermore, the closure element can be removed from the drainage opening when the shut-off valve is in its closed position. In particular, the closure element can be unscrewed from the receiving device for the closing section. It is then possible, in lieu of the closure element, for the collecting vessel of the collecting facility for the fuel to be connected in a fluid-conducting manner to the fuel line, in particular via the drainage opening. It is possible for this purpose to provide in particular that the connection of the collecting facility is screwed into the receiving device. In order to empty the second part of the fuel line and a pressure vessel, which where necessary is connected thereto, into the collecting vessel, the shut-off valve can be moved into its open position so that the through-flow can flow through the shut-off valve. Consequently, any fuel loss during maintenance of the valve assembly/the pressure vessel system can be reduced.

Moreover, the method can comprise method steps which correspond in each case to any of the functions explained above in connection with the closure element, the pressure vessel system or the vehicle.

In other words, the technology disclosed herein relates to a compact valve assembly which facilitates integration of the pressure vessel system having one or more pressure vessels into a battery storage installation space with a relatively low installation height. This is in particular rendered possible by integrating multiple functions into the shut-off valve. In particular, the function of two valves (so-called "manual valve" and normally closed "bleed valve") can be integrated into a single manually actuated shut-off valve. At the same time, the risk of an incorrect operation by opening a drainage opening under pressure is reduced. By virtue of the geometric design of the valve assembly, it is only possible to open a drain connection, possibly for an emergency emptying of an entire fuel supply system, when the manually actuated shut-off valve is closed.

The technology disclosed herein is now explained with the aid of the figures.

DETAILED DESCRIPTION OF THE DRAWINGS

Figure 1:
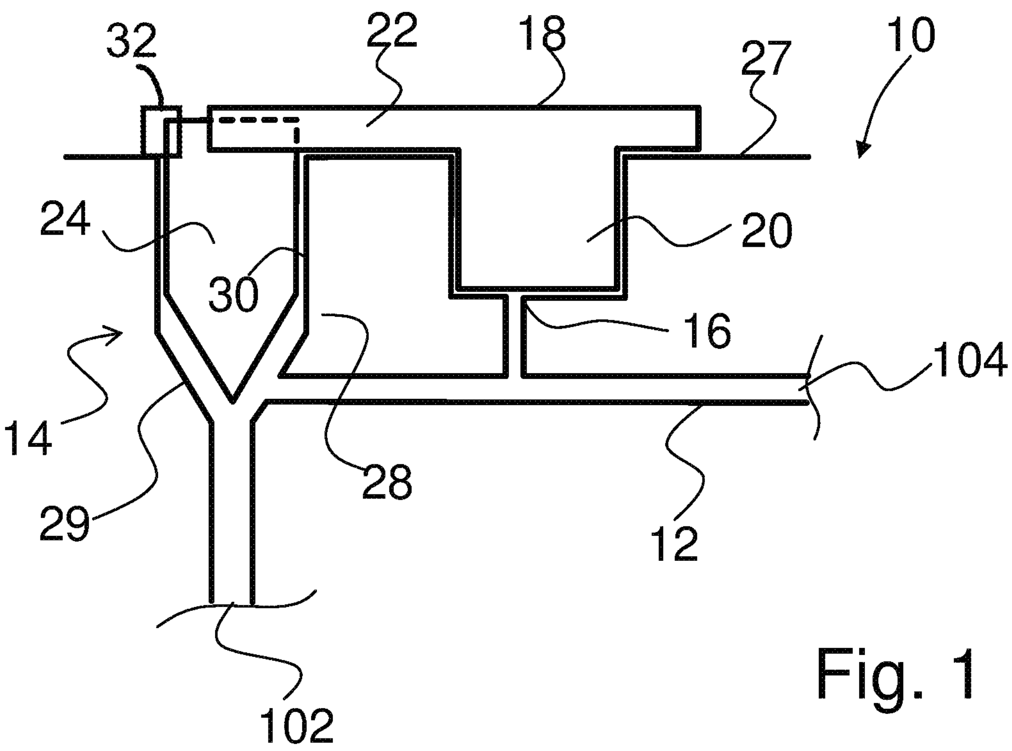
FIG. 1 shows a first variant of a valve assembly for a fuel pressure vessel system in a sectional view, wherein the shut-off valve is in its open position and the closure element is in the first position.

FIGS. 1 to 8 show a valve assembly 10 for a pressure vessel system 100 for storing a fuel in a vehicle 200, which in this case is a motor vehicle powered by the fuel. The valve assembly 10 comprises a fuel line 12 having an inlet 102 and an outlet 104, a manually actuated shut-off valve 14 on the fuel line 12, a drainage opening 16 that is connected to the fuel line 12 in a fluid-conducting manner, and a closure element 18 for the drainage opening 16. The shut-off valve 14 and the closure element 18 are directly mechanically coupled to one another due to their geometry and relative arrangement. In particular, the shut-off valve 14 is configured so as to block a movement of the closure element 18 from a first position, in which the closure element 18 closes the drainage opening 16, into a second position, in which the closure element 18 allows a through-flow through the drainage opening 16, when the shut-off valve 14 is in its open position ("is open", cf. FIG. 1). On the other hand, when the shut-off valve 14 is in its closed position ("is closed", cf. FIG. 3) that closes the fuel line 12, the shut-off valve 14 allows the closure element 18 to move from the first position into the second position.

In detail, this function is realized in this embodiment as follows. The closure element 18 comprises a closing section 20 and an engagement section 22 that extends from the closing section 20 to the shut-off valve 14. The closure element 18 is designed in this case as a screw closure, in particular as a plug with an outer thread, which is screwed into a receiving device. Alternatively, the screw closure can be designed as a bayonet closure. The receiving device is formed in a body of a valve block (hereinafter referred to as valve block body 27). When the closure element 18 is in the first position shown in FIGS. 1 to 4, the closing section 20 closes the drainage opening 16 so that essentially no fuel can escape from the fuel line 12 through the drainage opening 16. The engagement portion 22 is formed as a planar cantilever and is fork-shaped at its end opposite the closing section 20, thereby defining a recess 26.

Figure 3:
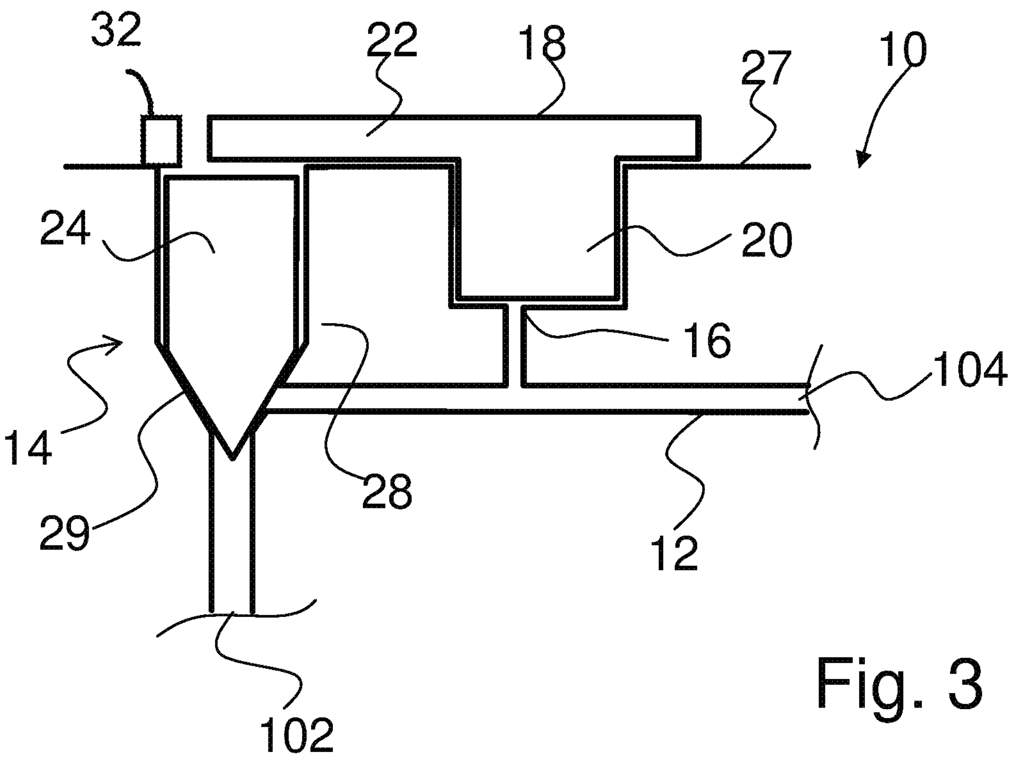
FIG. 3 shows the valve assembly of FIG. 1 in a sectional view, wherein the shut-off valve is in its closed position and the closure element is in the first position.
Figure 4:
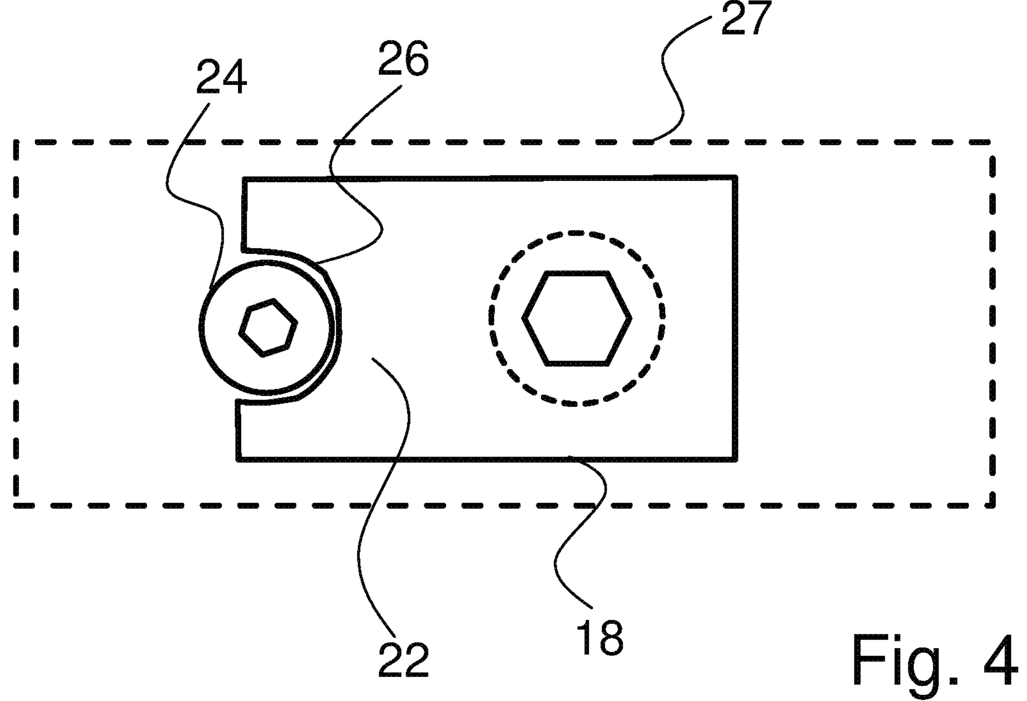
FIG. 4 shows the valve assembly of FIG. 1 in a plan view, wherein the shut-off valve is in its closed position and the closure element is in the first position.
Figure 5:
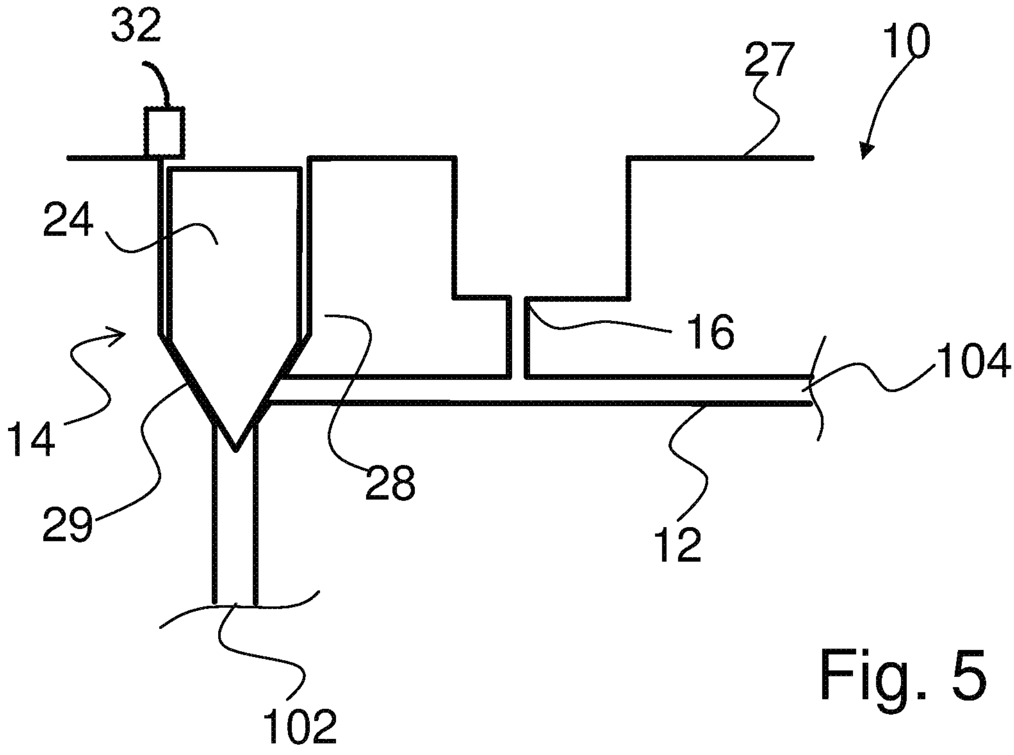
FIG. 5 shows the valve assembly of FIG. 1 in a sectional view, wherein the shut-off valve is in its closed position and the closure element is in the second position.
Figure 6:
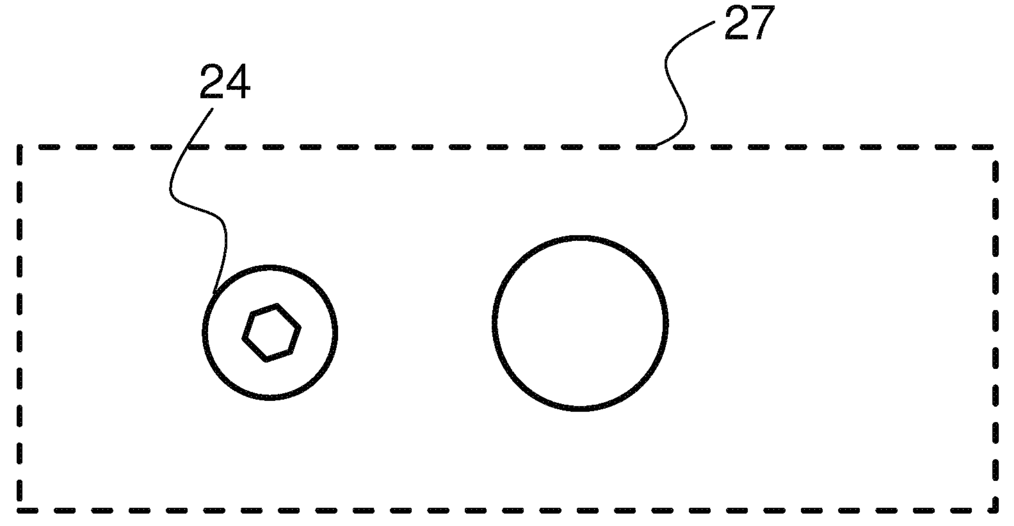
FIG. 6 shows the valve assembly of FIG. 1 in a plan view, wherein the shut-off valve is in its closed position and the closure element is in the second position.

The shut-off valve 14 comprises a valve body 28, which is formed in one piece (here: monolithically) with the valve block body 27 and defines a seal seat 29 with which a valve element that is formed as a locking bolt 24 is in sealing contact when the shut-off valve 14 is in its closed position (see FIG. 3). The locking bolt 24/the valve element is conical at its end facing the seal seat 29; the same applies to the seal seat 29 itself, so that the shut-off valve 14 is suitable even for comparatively high fuel pressures. A receiving device 30 that is formed in the valve body 28 for the locking bolt 24 is axially longer (in relation to an axis of movement along which the locking bolt 24 moves between the open position and the closed position) than the locking bolt 24, so that the locking bolt 24 can be fully inserted into the valve body 28. The receiving device 30 is provided with a stop 32 which limits how far the locking bolt 24 can be unscrewed from the receiving device 30.

Figure 2:
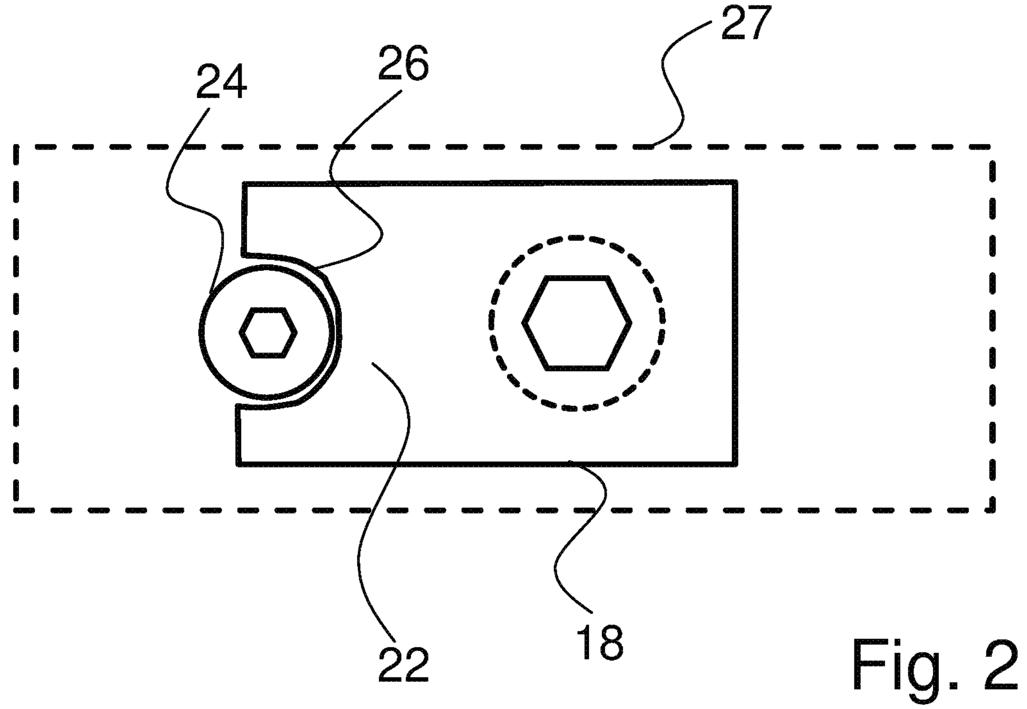
FIG. 2 shows the valve assembly of FIG. 1 in a plan view, wherein the shut-off valve is in its open position and the closure element is in the first position.

When the shut-off valve 14 is open and the closure element 14 is in its first position (cf. FIGS. 1 and 2), the locking bolt 24 protrudes from the receiving device 30 beyond the outer surface of the valve body 28 and into the recess 26. As shown in FIG. 2, the locking bolt 24 thus blocks the path of the engagement section 22 so that the latter cannot be moved, in this case screwed, from the first position, in which the closure element 18 closes the drainage opening 16, into its second position, in which the draining opening 16 is not closed.

In order to release pressure from a first part of the fuel line 12 that is located to the right of the shut-off valve 14 in FIG. 1 while maintaining the pressure in a second part of the fuel line 12 that is located below the shut-off valve 14 in FIG. 1, for example during maintenance, the locking bolt 24 can be screwed in manually (here, for example, by means of a first tool, for example a hex key) in the direction of the seal seat 29 until the conical end of the locking bolt 24 comes into contact with the seal seat 29. Only when the shut-off valve 14 is in this closed position shown in FIGS. 3 and 4 does the locking bolt 24, due to lack of engagement in the engagement section 22, allow the closure element 18 to be completely unscrewed from the associated receiving device, in this case advantageously by means of another, second tool, in particular another hex key). In this example, the closure element 18 is thus completely removed from the associated receiving device in the second position.

The process described is reversible insofar as the closure element 18 can be screwed back into the associated receiving device in the valve block body 27. As soon as the closure element 18 is back in its first position in which it closes the draining opening 16, the recess 26 overlaps the locking bolt 24 (cf. FIG. 2), so that the locking bolt 24 can be unscrewed axially away from the seal seat 29, in particular as far as the stop 32; the shut-off valve 14 is then open again.

Figure 7:
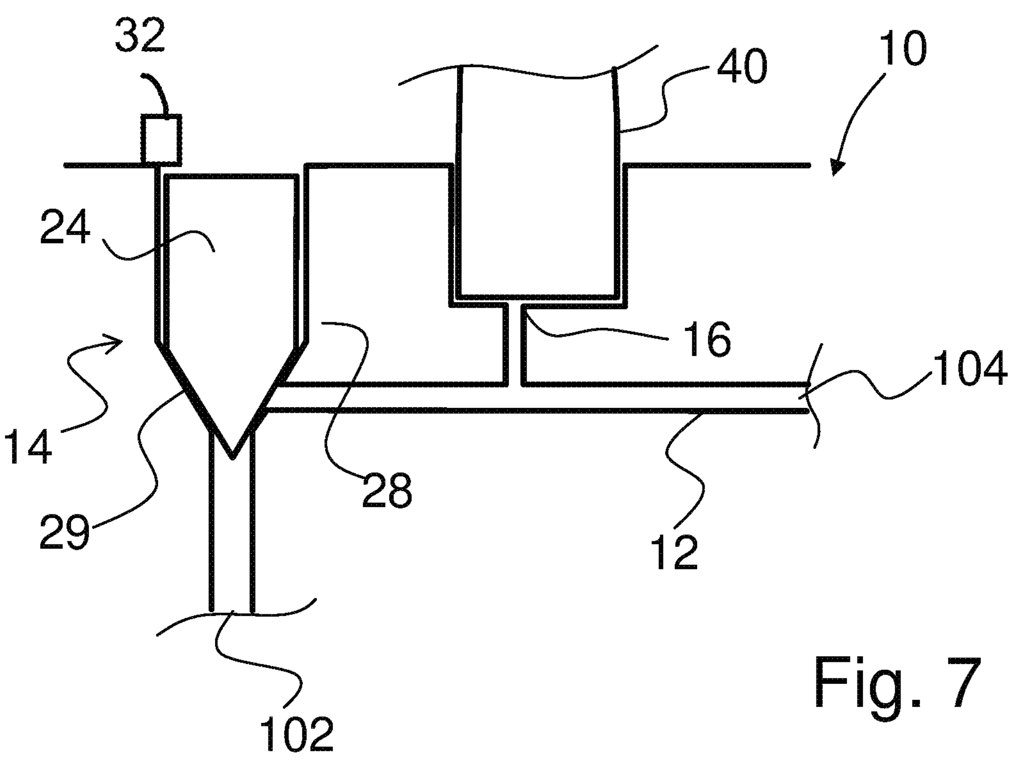
FIG. 7 shows the valve assembly of FIG. 1 in a sectional view, wherein the shut-off valve is in its closed position and the collecting facility is connected to the fuel line in a fluid-conducting manner.
Figure 8:
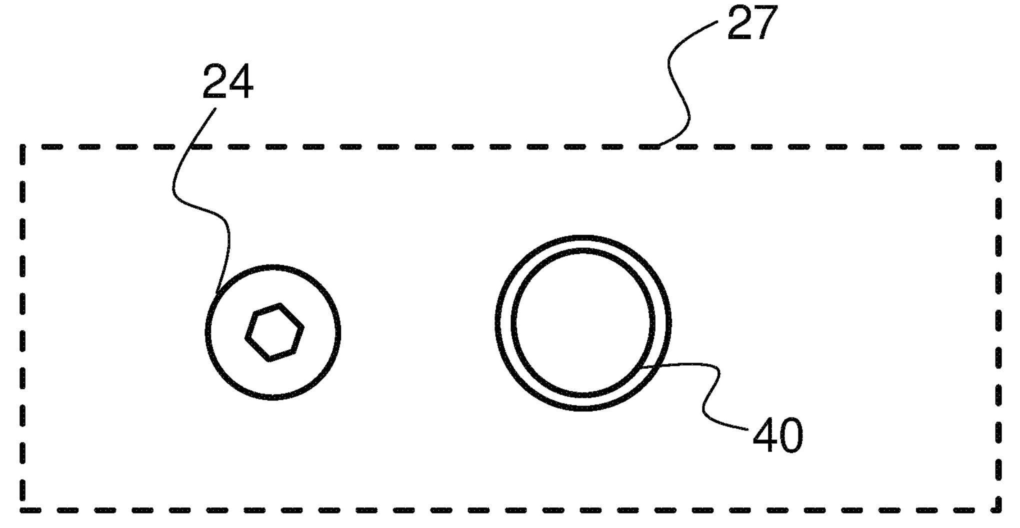
FIG. 8 shows the valve assembly of FIG. 1 in a plan view, wherein the shut-off valve is in its closed position and the collecting facility is connected to the fuel line in a fluid-conducting manner.

Alternatively, the valve assembly 10 can have a separate collecting facility 40 for drained fuel, partially shown in FIG. 7, which has a collecting vessel that is connected to the fuel line 12 in a fluid-conducting manner by means of a connection via the drainage opening 16. It is provided that the connection of the collecting facility 40 is connected to the receiving device for the closing element 18 by means of the same positive-locking connection as the closure element 18. In this case, the connection of the collecting facility 40 therefore comprises the same outer thread as the closing section 20. In order to drain the pressurized fuel from the second part of the fuel line 12, it is provided accordingly that the shut-off valve 14 is moved into its open position.

Figure 9:
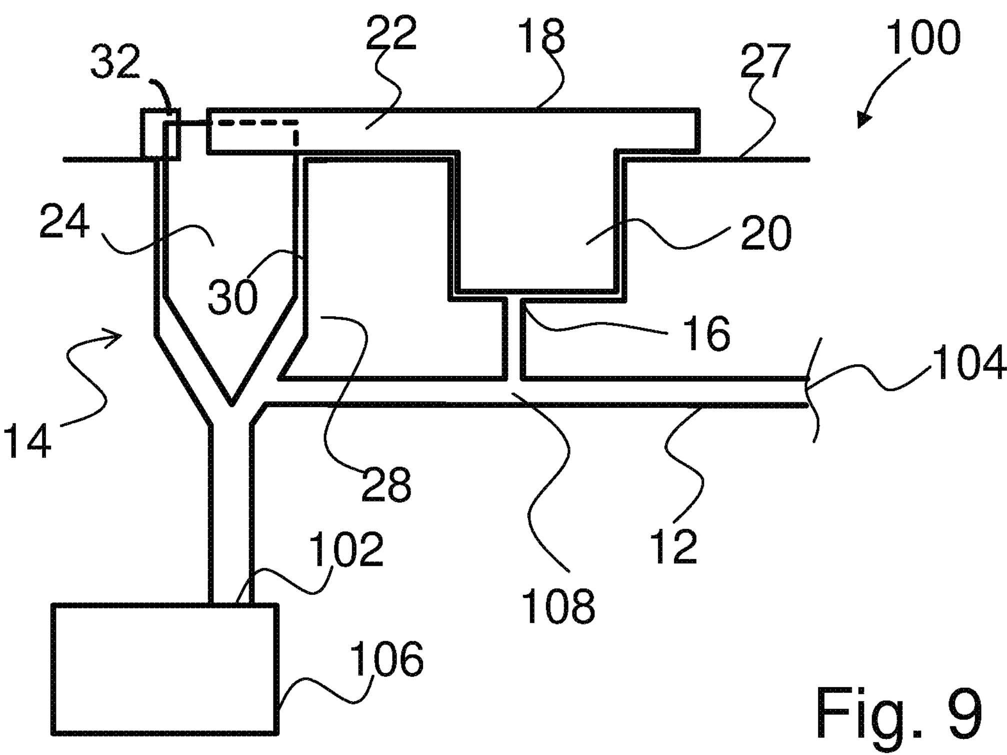
FIG. 9 shows a pressure vessel system for storing fuel.

A pressure vessel system 100 shown in FIG. 9 is designed to store fuel and, in addition to the valve assembly 10, comprises one or more pressure vessels 106 for the fuel which are connected to the inlet 102 of the fuel line 12 in a fluid-conducting manner. As with the valve assembly 10 of FIGS. 1 to 8, the drainage opening 16 is connected to the fuel line 12 at a (connection) site 108 on the fuel line 12 between the shut-off valve 14 and the outlet 104. In a flow direction of the fuel from the pressure vessel 106 or from the inlet 102 in the direction of the site 108, the shut-off valve 14 is located upstream of the site 108, thus upstream of the drainage opening 16. Therefore, if during the draining process described above not only the second part of the fuel line 12 (the part between the inlet 102 and the shut-off valve 14), but also the pressure vessel(s) 106 are to be emptied into the collecting vessel, this can be done in a similar manner by opening the shut-off valve 14.

Figure 10:
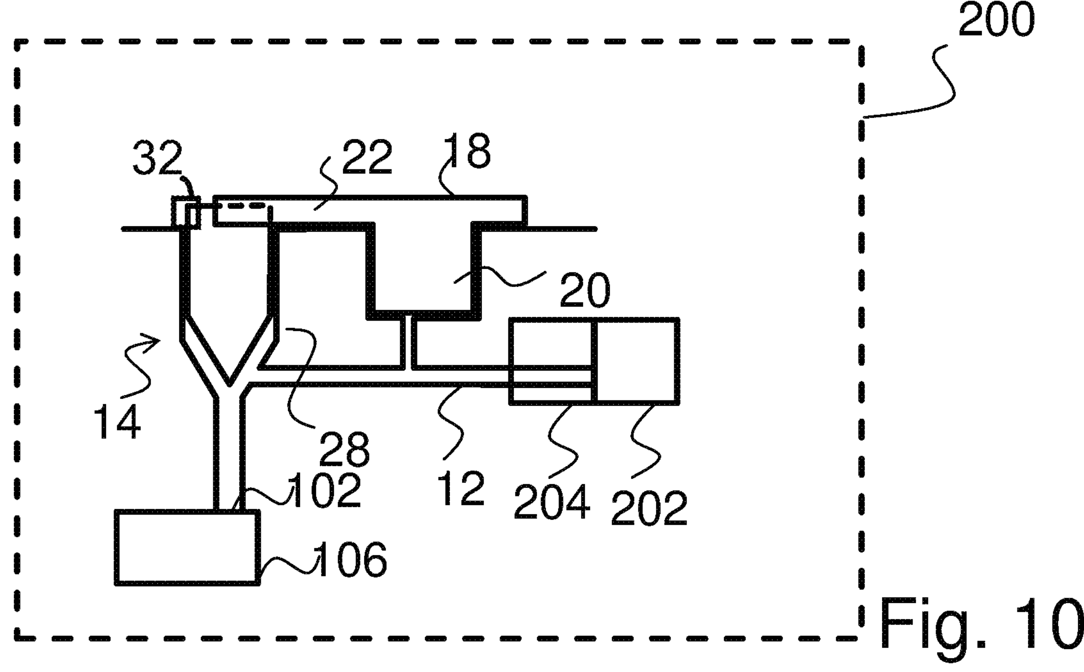
FIG. 10 shows a vehicle with the pressure vessel system.

FIG. 10 shows the vehicle 200 with the pressure vessel system 100 in a highly simplified form. The vehicle 200 also comprises a drive unit 202, which is connected to the outlet 104 in a fluid-conducting manner by means of a fuel supply system 204. The drive unit 202 can, for example, have a thermal or chemical energy converter, in particular a fuel cell. When emptying the first part of the fuel line 12 (between the shut-off valve 14 and the outlet 104), that part of the fuel supply system 204 which is connected to the outlet 104 in a fluid-conducting manner can thus be simultaneously emptied safely and effectively in a comparatively simple manner.

Figure 11:
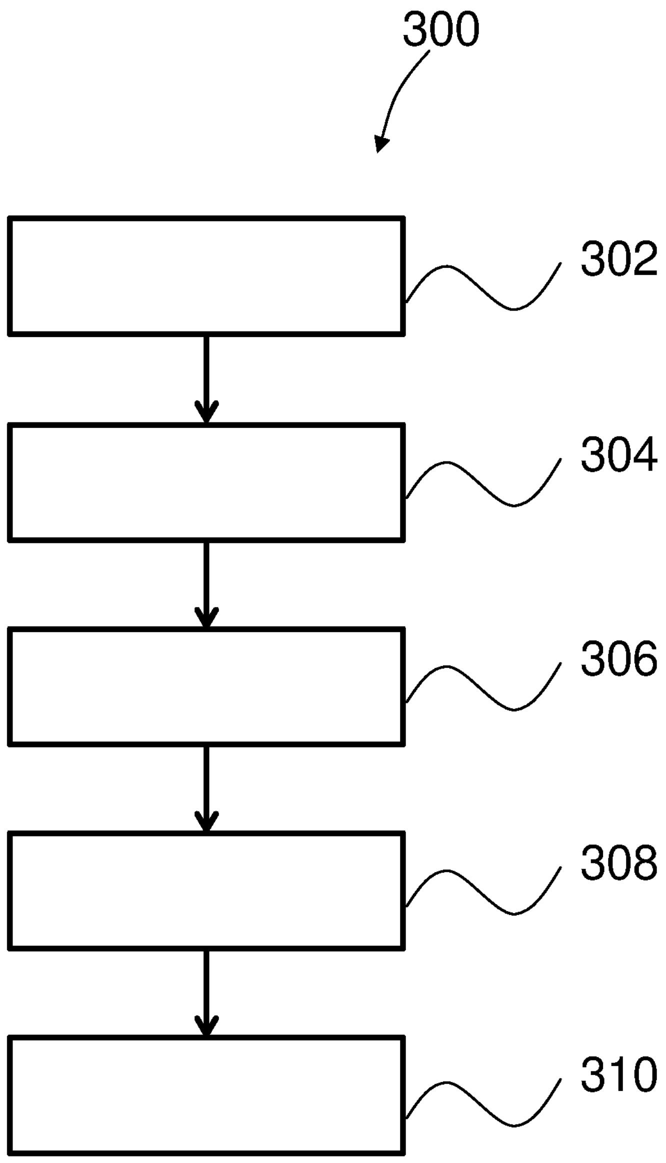
FIG. 11 shows a method for draining fuel by means of the pressure vessel system.

Finally, FIG. 11 shows a method 300 in which fuel is drained from the valve assembly 10 or the pressure vessel system 100 in a simple and advantageous manner. Firstly, in the case of this method, in a first step 302, the fuel line 12 is closed by means of the shut-off valve 14, after which the shut-off valve 14 is in its closed position. In the subsequent step 304, the closure element 18 is moved from the first position into the second position, in particular screwed. As a result, the pressure or fuel is drained from the first part of the fuel line 12. Subsequently, in a step 306, the closure element 18 is completely removed from the drainage opening 16, in particular removed from the receiving device for the closure element 18. After the collecting vessel has been connected to the fuel line 12 in a fluid-conducting manner in a step 308, the shut-off valve 14 is moved into its open position in the step 310 in order to allow a through-flow through the shut-off valve 14. The pressure vessel 106 can thus empty into the collecting vessel.

For ease of reading, the term "at least one" has been partially omitted. Where a feature of the technology disclosed herein is described in the singular or indefinitely (for example the/a fuel line, the/a shut-off valve, the/a closure element, etc.), the plurality thereof is also to be disclosed at the same time (for example the at least one fuel line, the at least one shut-off valve, the at least one closure element, etc.). In the context of the technology disclosed herein, the term "essentially" in each case includes the exact property or the exact value as well as any deviations that are insignificant for the function of the property/the value.

The above description of the present invention is used only for illustration purposes and not for the purpose of limiting the invention. Within the scope of the invention, different changes and modifications are possible, without departing from the scope of the invention and its equivalents.

What is claimed is:

1. A valve assembly for a fuel pressure vessel system, comprising:

a fuel line;

a manually actuated shut-off valve on the fuel line, the shut-off valve comprising a valve body and a valve element formed as a locking bolt that is screwably fastened in the valve body and has a conical tip configured, in a closed position, to seal against a conical seal seat of the shut-off valve and, in an open position, to protrude beyond an outer surface of the valve body;

a drainage opening connected to the fuel line in a fluid-conducting manner and having a receiving device; and a closure element configured as a screw closure, the closure element comprising a closing section that closes the drainage opening in a first position and an engagement section rigidly connected to the closing section and extending toward the shut-off valve, the engagement section defining a recess;

wherein the shut-off valve is configured so as to prevent a movement of the closure element from a first position, in which the closure element closes the drainage opening, into a second position, in which the closure element releases a through-flow through the drainage opening, when the shut-off valve is in the open position, by the locking bolt engaging the recess of the engagement section in a positive-locking manner; and wherein the shut-off valve is configured so as to allow the movement of the closure element from the first position into the second position when the shut-off valve is in a closed position closing the fuel line, with the locking bolt sealed against the conical seal seat and disengaged from the recess.

2. The valve assembly according to claim 1, wherein the closure element is locked in the first position via the shut-off valve by said positive-locking engagement of the locking bolt in the recess when the shut-off valve is in the open position.

3. The valve assembly according to claim 1, wherein the closure element has the closing section that closes the drainage opening in the first position and the engagement section that extends from the closing section to the shut-off valve, wherein the engagement section is formed as a planar cantilever that extends radially with respect to the receiving device and the recess is arranged at an end of the cantilever facing the shut-off valve; and the shut-off valve engages with the engagement section when the shut-off valve is in the open position and/or the closure element in the first position.

4. The valve assembly according to claim 1, wherein the shut-off valve has the locking bolt, which engages with the recess that is formed in the closure element, when the shut-off valve is in the open position and/or the closure element is in the first position.

5. The valve assembly according to claim 4, wherein the locking bolt is disengaged from the closure element in the closed position, irrespective of whether the closure element is in the first or the second position.

6. The valve assembly according to claim 4, wherein the locking bolt is the valve element of the shut-off valve.

7. The valve assembly according to claim 4, wherein the locking bolt is screwably fastened in the valve body of the shut-off valve, and the valve body has a stop which is designed so as to limit a movement of the locking bolt in a direction away from the conical seal seat of the shut-off valve when the shut-off valve is in the open position.

8. The valve assembly according to claim 7, wherein the locking bolt is inserted in a second receiving device that is formed in the valve body in the closed position.

9. The valve assembly according to claim 1, further comprising:

a collecting facility which is designed so as to connect to the drainage opening by the same positive-locking connection used by the closure element, and to collect fuel that is drained via the drainage opening.

10. A pressure vessel system for storing fuel, comprising:

a valve assembly according to claim 1, wherein the fuel line has an inlet and an outlet, and at least one pressure vessel for fuel which is connected to the inlet in a fluid-conducting manner, wherein the drainage opening is connected to the fuel line at a site on the fuel line between the shut-off valve and the outlet, and in a flow direction from the inlet toward the outlet, the shut-off valve is located upstream of the drainage opening.

11. A vehicle, comprising:

a pressure vessel system according to claim 10; and a drive unit, wherein the drive unit is connected to the outlet of the fuel line in a fluid-conducting manner.

12. A method for draining fuel from a valve assembly having a fuel line;

a manually actuated shut-off valve on the fuel line, the shut-off valve comprising a valve body and a locking-bolt valve element having a conical tip for sealing against a conical seal seat;

a drainage opening connected to the fuel line in a fluid-conducting manner; and a closure element designed as a screw closure, the closure element having an engagement section with a recess, and wherein in an open position the locking bolt engages the recess to block movement of the closure element and in a closed position the locking bolt disengages from the recess;

wherein the shut-off valve is configured so as to prevent a movement of the closure element from a first position, in which the closure element closes the drainage opening, into a second position, in which the closure element releases a through-flow through the drainage opening, when the shut-off valve is in an open position, and wherein the shut-off valve is configured so as to allow the movement of the closure element from the first position into the second position when the shut-off valve is in a closed position closing the fuel line, the method comprising the steps of:

closing the fuel line via the shut-off valve by axially advancing the locking bolt into sealing contact with the conical seal seat so that the locking bolt disengages from the recess; and moving the closure element from the first position into the second position by unscrewing the closure element from a receiving device of the drainage opening.

13. A method for draining fuel from a valve assembly having a fuel line;

a manually actuated shut-off valve on the fuel line;

a drainage opening connected to the fuel line in a fluid-conducting manner; and a closure element designed as a screw closure, wherein the shut-off valve is configured so as to prevent a movement of the closure element from a first position, in which the closure element closes the drainage opening, into a second position, in which the closure element releases a through-flow through the drainage opening, when the shut-off valve is in an open position, and wherein the shut-off valve is configured so as to allow the movement of the closure element from the first position into the second position when the shut-off valve is in a closed position closing the fuel line, the method comprising the steps of:

closing the fuel line via the shut-off valve so that the shut-off valve is in the closed position;

moving the closure element from the first position into the second position;

removing the closure element from the drainage opening;

connecting a collecting vessel to the fuel line in a fluid-conducting manner via the drainage opening; and moving the shut-off valve into the open position in order to allow through-flow through the shut-off valve.

* * * * *